US008626713B2

(12) United States Patent
Adkins et al.

(10) Patent No.: US 8,626,713 B2
(45) Date of Patent: Jan. 7, 2014

(54) MULTIPLE CONTEXTS IN A REDIRECT ON WRITE FILE SYSTEM

(75) Inventors: Janet E. Adkins, Austin, TX (US); Joon Chang, Austin, TX (US); David J. Craft, Wimberly, TX (US); Manoj N. Kumar, Austin, TX (US); Andrew N. Solomon, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/963,146

(22) Filed: Dec. 8, 2010

(65) Prior Publication Data
US 2012/0150804 A1 Jun. 14, 2012

(51) Int. Cl.
*G06F 17/30* (2006.01)
(52) U.S. Cl.
USPC .......................................... 707/639; 707/825
(58) Field of Classification Search
USPC ............. 707/639, 770, 652, 665, 202, 102, 8, 707/649, 825, 768, 703; 711/161, 162
See application file for complete search history.

(56) References Cited

U.S. PATENT DOCUMENTS

| 5,287,496 | A  | * | 2/1994  | Chen et al. ............................. 1/1 |
| 5,553,279 | A  | * | 9/1996  | Goldring ........................ 707/615 |
| 5,819,292 | A  | * | 10/1998 | Hitz et al. .............................. 1/1 |
| 5,864,849 | A  | * | 1/1999  | Bohannon et al. ............ 707/648 |
| 6,085,197 | A  | * | 7/2000  | Federighi et al. ...................... 1/1 |
| 6,233,105 | B1 |   | 5/2001  | Chen et al. |
| 6,237,001 | B1 | * | 5/2001  | Bamford et al. ....................... 1/1 |
| 6,529,913 | B1 | * | 3/2003  | Doig et al. ............. 707/999.101 |
| 6,560,601 | B1 | * | 5/2003  | Bjornerstedt ......................... 1/1 |
| 6,779,093 | B1 |   | 8/2004  | Gupta |
| 7,028,083 | B2 |   | 4/2006  | Levine et al. |
| 7,111,021 | B1 | * | 9/2006  | Lewis et al. ................... 707/649 |
| 7,418,463 | B2 | * | 8/2008  | Verma et al. .......................... 1/1 |
| 7,437,360 | B1 |   | 10/2008 | Chitre et al. |
| 7,467,265 | B1 | * | 12/2008 | Tawri et al. .................... 711/161 |

(Continued)

FOREIGN PATENT DOCUMENTS

WO    2010042109    2/2010

OTHER PUBLICATIONS

Ellenberg, Lars , "DRBD 9 & Device-Mapper Linux Block Level Storage Replication", 2008-2009 , 12 pages.

(Continued)

*Primary Examiner* — James Trujillo
*Assistant Examiner* — Thong Vu
(74) *Attorney, Agent, or Firm* — DeLizio Gilliam, PLLC

(57) ABSTRACT

A method includes initiating committing to persistent storage of a current consistency snapshot of a plurality of data objects in a redirect-on-write file system. Each of the plurality of data objects has a first copy of at least two copies of the data having a first context of at least two contexts. The method includes receiving, during committing to storage of the current consistency snapshot, an update to a data object of the plurality of data objects. The method also includes responsive to receipt of the update to the data object, creating a second copy of data of the data object from the first copy. The second copy of the data has a second context of the at least two contexts. The method includes responsive to receipt of the update to the data object, updating, based on the update, the second copy of the data of the data object.

20 Claims, 7 Drawing Sheets

(56) References Cited

U.S. PATENT DOCUMENTS

| | | | |
|---|---|---|---|
| 7,472,129 B2 * | 12/2008 | Adya et al. | 1/1 |
| 7,526,668 B2 | 4/2009 | Shitomi et al. | |
| 7,587,429 B2 * | 9/2009 | Liedes et al. | 1/1 |
| 7,599,941 B2 | 10/2009 | Bahar | |
| 7,617,217 B1 | 11/2009 | Chen et al. | |
| 7,640,274 B2 | 12/2009 | Tinker et al. | |
| 7,640,278 B2 * | 12/2009 | Lashley et al. | 1/1 |
| 7,698,289 B2 | 4/2010 | Kazar et al. | |
| 7,734,669 B2 * | 6/2010 | Kottomtharayil et al. | 1/1 |
| 7,747,584 B1 | 6/2010 | Jernigan, IV | |
| 7,814,118 B2 * | 10/2010 | Kottomtharayil et al. | 707/770 |
| 7,840,537 B2 * | 11/2010 | Gokhale et al. | 707/652 |
| 7,904,434 B2 * | 3/2011 | Yalamanchi et al. | 707/703 |
| 7,953,706 B2 * | 5/2011 | Prahlad et al. | 707/665 |
| 7,984,085 B1 * | 7/2011 | Aggarwal et al. | 707/825 |
| 8,095,511 B2 * | 1/2012 | Zwilling et al. | 707/649 |
| 2008/0256138 A1 * | 10/2008 | Sim-Tang | 707/202 |
| 2009/0240744 A1 | 9/2009 | Thomson et al. | |
| 2009/0319486 A1 * | 12/2009 | Surlaker et al. | 707/3 |
| 2009/0327798 A1 | 12/2009 | D'Amato et al. | |
| 2010/0125751 A1 | 5/2010 | Mckean | |
| 2011/0178972 A1 | 7/2011 | Navarro et al. | |
| 2011/0238936 A1 * | 9/2011 | Hayden | 711/162 |
| 2012/0030265 A1 | 2/2012 | Anderson et al. | |
| 2012/0150800 A1 | 6/2012 | Adkins et al. | |
| 2012/0150926 A1 | 6/2012 | Adkins et al. | |
| 2012/0151245 A1 | 6/2012 | Chang et al. | |
| 2012/0216074 A1 | 8/2012 | Chang et al. | |

OTHER PUBLICATIONS

Shvachko, Konstantin et al., "The Hadoop Distributed File System", *Google/IEEE* 2010, 10 pages.

Suk, Jinsun et al., "Snapshot-Based Data Backup Scheme: Open ROW Snapshot", *Lecture Notes in Computer Science*, vol. 5545 before INSPECT/Springer-Verlag 2009, pp. 657-666.

Ungureanu, Cristian et al., "HydraFS: a High-Throughput File System for the HYDRAstor Content-Addressable Storage System", *NEC Laboratories America* 2009-2010, 14 pages.

Weil, Sage et al., "RADOS: A Scalable, Reliable Storage Service for Petabyte-Scale Storage Clusters", 2008-2009, 24 pages.

Cardellini, Valeria "Redirection Algorithms for Load Sharing in Distributed Web-Server Systems", *Proceedings 19th IEEE International Conference on Distributed Computing Systems* May 31-Jun. 4, 1999, 8 pages.

Cluster File Systems, Inc., "Lustre: A Scalable, High-Performance File System", Nov. 11, 2002, 13 pages.

Hewlett-Packard, "Veritas Storage Foundation 4.1 Release Notes", Sep. 2005, 58 pages.

Lee, Edward K. "A Comparison of Two Distributed Disk Systems", *Technical Report 155, Systems Research Center, Digital Equipment Corporation* Sep. 27, 2001, 15 pages.

Mushran, Sunil "OCFS2—A Cluster File System for Linus-User's Guide for Release 1.4", Jul. 2008, 44 pages.

Panasas Inc., "Object Storage Architecture", *Panasas White Paper* Jan. 25, 2005, 24 pages.

Symantec, "The VERITAS Cluster File System: Technology and Usage", ISBN 0-321-446100 2010, 252 pages.

Tewari, Renu "IBM Research Report—Glamour: A Wide-Area File System Middleware Using NFSv4", 2005, 15 pages.

Veritas Software Corp., "Veritas Storage Foundation 4.0 Release Notes", Nov. 2006, 40 pages.

Weil, Sage A. "Ceph: A Scalable, High-Performance Distributed File System", http://www.ssrc.ucsc.edu/Papers/weil-osdi06.pdf (Obtained from the Internet on Jan. 4, 2011) Nov. 2006, 14 pages.

Whitaker, Christopher "Design of the Server for the Spiralog File System", *Digital Technical Journal*, vol. 8, No. 2 1996, pp. 15-31.

"PCT Application No. PCT/EP2011/070938 International Search Report", May 10, 2012, 9 pages.

"U.S. Appl. No. 12/963,166 Office Action", May 17, 2012, 14 pages.

Cardellini, Valeria et al., "Redirection Algorithms for Load Sharing in Distributed Web-Server Systems", Proceedings 19th IEEE International Conference on Distributed Computing Systems May 31-Jun. 4, 1999, 8 pages.

Cluster File Systems, Inc. "Lustre: A Scalable, High-Performance File System", Nov. 11, 2002, 13 pages.

Hewlett-Packard, ,"Veritas Storage Foundation 4.1 Release Notes", Sep. 2005, 58 pages.

Lee, Edward K. et al., "A Comparison of Two Distributed Disk Systems", Technical Report 155, Systems Research Center, Digital Equipment Corporation Sep. 27, 2001, 15 pages.

Mushran, Sunil , "OCFS2—A Cluster File System for Linux—User's Guide for Release 1.4", Jul. 2008, 44 pages.

Panasas Inc. "Object Storage Architecture", Panasas White Paper Jan. 25, 2005, 24 pages.

Symantec, ,"The VERITAS Cluster File System: Technology and Usage", ISBN 0-321-446100 2010, 252 pages.

Tewari, Renu et al., "IBM Research Report—Glamour: A Wide-Area File System Middleware Using NFSv4", 2005, 15 pages.

Veritas Software Corp., , "Veritas Storage Foundation 4.0 Release Notes", Nov. 2006, 40 pages.

Weil, Sage A. et al., "Ceph: A Scalable, High-Performance Distributed File System", http://www.ssrc.ucsc.edu/Papers/weil-osdi06.pdf (Obtained from the Internet on Jan. 4, 2011) Nov. 2006, 14 pages.

Whitaker, Christopher et al., "Design of the Server for the Spiralog File System", Digital Technical Journal, vol. 8, No. 2 1996, pp. 15-31.

Xiao, Weijun et al., "Design and Analysis of Block-Level Snapshots for Data Protection and Recovery", IEEE Transactions on Computers, vol. 58, No. 12 Dec. 2009, pp. 1615-1625.

Zhang, Chen et al., "Supporting Multi-row Distributed Transactions with Global Snapshot Isolation Using Bare-bones HBase", 11th IEEE/ACM International Conference on Grid Computing 2010, pp. 177-184.

"U.S. Appl. No. 12/963,166 Final Office Action", Aug. 30, 2012, 34 pages.

U.S. Appl. No. 12/963,068, filed Dec. 8, 2010, Adkins, Janet E., et al.
U.S. Appl. No. 12/963,078, filed Dec. 8, 2010, Chang, Joon et al.
U.S. Appl. No. 12/963,166, filed Dec. 8, 2010, Adkins, Janet E., et al.
U.S. Appl. No. 13/458,796, filed Apr. 27, 2012, Chang, Joon et al.
"U.S. Appl. No. 12/963,078 Office Action", Sep. 3, 2013, 14 pages.
"U.S. Appl. No. 13/458,796 Office Action", Aug. 23, 2013, 32 Pages.

* cited by examiner

300

| Buffer Header |
|---|
| 302 — Last Commited Generation (LCG) |
| 304 — Last Updated Generation (LUG) |
| 306 — Last Commited Context (LCX) |
| 308 — Last Updated Context (LUX) |
| 310 — Physical Location |
| 312 — Logical Location |
| 314 — Data Pointer 0 (pointing to first copy of data) |
| 316 — Data Pointer 1 (pointing to second copy of data) |

FIG. 3

MULTIPLE CONTEXTS IN A REDIRECT ON WRITE FILE SYSTEM

BACKGROUND

Embodiments of the inventive subject matter generally relate to the field of computers, and, more particularly, to data backups in a redirect on write file system.

File systems employ different methods to ensure the consistency therein in the event of a system crash. One approach is for the file system to write modified data to new locations on disk in a bottom-up order every few seconds. These views of the data stored therein are called consistency snapshots. After a system crash, the file system starts with the top of the last consistency snapshot of the file system which is guaranteed to be consistent.

While the consistency snapshot is being written, new changes to the file system could be attempted by a user. It would be easy to block these changes until the consistency snapshot is committed to storage on a non-volatile machine-readable medium (e.g., hard disk). However, this approach is not acceptable because such an approach would lead to consistency snapshots not being transparent to the user. In particular, this approach can cause the entire file system to freeze every few seconds, while the consistency snapshot is being committed to storage.

SUMMARY

Embodiments include a method comprising initiating committing to storage, into a nonvolatile machine-readable medium, of a current consistency snapshot of a plurality of data objects in a redirect-on-write file system, wherein each of the plurality of data objects have a first copy of data of the plurality of data objects having a commit-in-progress context. The method also includes assigning a generation value to the current consistency snapshot that is unique relative to generation values of other consistency snapshots. The method includes receiving, during the committing to storage of the current consistency snapshot, an update to a data object of the plurality of data objects. The method also includes, responsive to receiving the update to the data object, incrementing a generation value for the data object. The method includes, responsive to receiving the update to the data object, associating a generation value to the update that is derived from the generation value of the data object. Also responsive to receiving the update to the data object, the method includes creating a second copy of data of the data object that is copied from the first copy of the data of the data object. The second copy of the data of the data object has an update-in-progress context. Also responsive to receiving the update to the data object, the method includes updating, based on the update, the second copy of the data of the data object, independent of updating the first copy of the data of the data object.

Embodiments include a method comprising initiating committing to persistent storage of a current consistency snapshot of a plurality of data objects in a redirect-on-write file system, each of the plurality of data objects configurable to have multiple copies of data of the plurality of data objects having different contexts. Each of the plurality of data objects has a first copy of at least two copies of the data having a first context of at least two contexts. The method includes receiving during committing to storage of the current consistency snapshot, an update to a data object of the plurality of data objects. Responsive to receipt of the update to the data object, the method includes creating a second copy of data of the data object from the first copy. The second copy of the data having a second context of at least two contexts. Responsive to receipt of the update to the data object, the method also includes updating, based on the update, the second copy of the data of the data object.

BRIEF DESCRIPTION OF THE DRAWINGS

The present embodiments may be better understood, and numerous objects, features, and advantages made apparent to those skilled in the art by referencing the accompanying drawings.

FIG. 3 depicts an example buffer header for a data object stored in a clustered file system, according to some embodiments.

DESCRIPTION OF EMBODIMENT(S)

Figure 1:
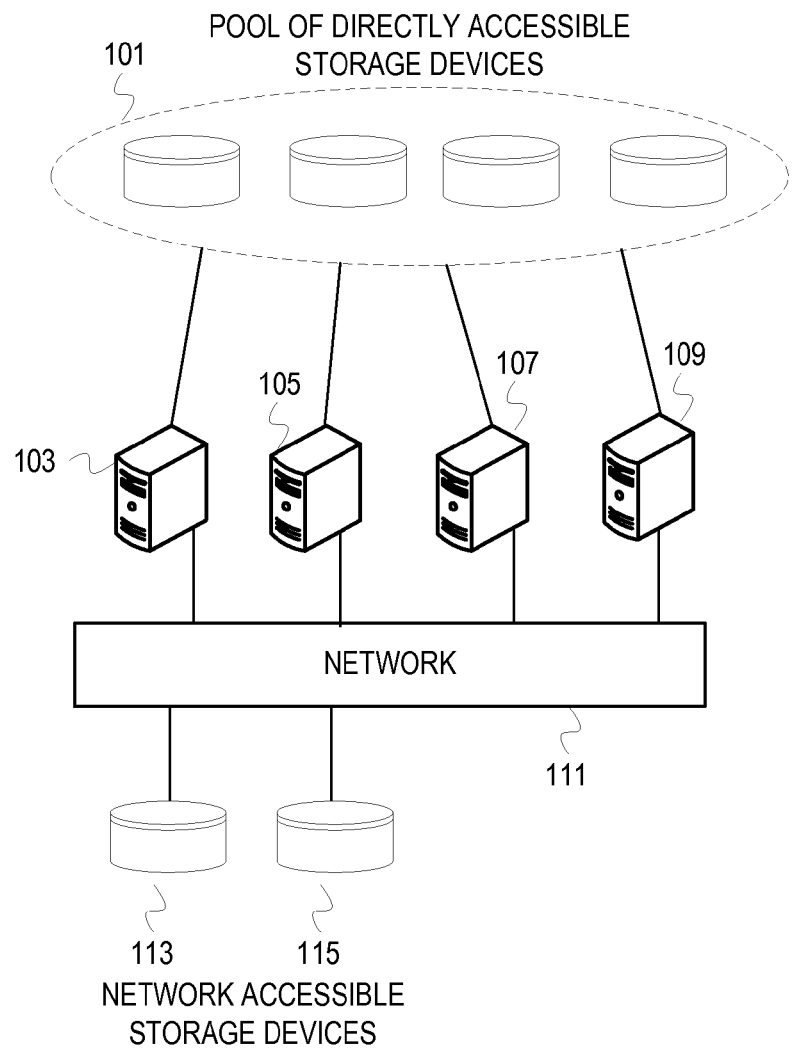
FIG. 1 depicts a conceptual diagram of a clustered file system configuration to provide multiple contexts for data objects in a redirect-on-write file system, according to some example embodiments.

The description that follows includes example systems, methods, techniques, instruction sequences and computer program products that embody techniques of the present inventive subject matter. However, it is understood that the described embodiments may be practiced without these specific details. For instance, although examples refer to a dual context for data that is part of a file system, some other example embodiments can configure any number of contexts for the data (e.g., three, four, five, etc.). Also while described such that a consistency snapshot is created for a file system, in some other example embodiments consistency snapshots at other levels can be created. For example, a user can configure a subset of files, a particular file, etc. to be backed up into a consistency snapshot more frequently than the periodic snapshots for the file system. Accordingly, some example embodiments are applicable to these other levels of consistency snapshots. In other instances, well-known instruction instances, protocols, structures and techniques have not been shown in detail in order not to obfuscate the description.

A cluster is formed from multiple computer systems or nodes and resources, including persistent storage resources. A clustered file system is implemented across the storage resources of a cluster. The cluster storage resources are coupled to allow direct access by the nodes of the cluster. The storage resources can be directly cabled to the nodes and/or accessible via a network (e.g., storage area network).

When a cluster is established, an administrator configures one of the nodes of the cluster to operate as a cluster leader. Embodiments can also program a cluster to automatically choose the leader. The cluster leader maintains cluster role data that indicates whether a node is a client, server, or both client and server. A server manages a fileset in the clustered file system. The cluster leader also maintains an indication of which node operates as a clustered file system manager. The clustered file system manager manages metadata for the clustered file system. In some embodiments, the clustered file system manager is the only server for the cluster—not accounting for a failover server. In some embodiments, the clustered file system manager delegates management of filesets within the clustered file system to other nodes that are servers. The term "fileset" is used herein to refer to a set of files and/or directories. Along with the indication of which nodes are servers within the cluster, the cluster leader can maintain an indication of the filesets managed by the servers or "fileset managers." A node within a cluster can be configured to operate as the cluster leader and the clustered file system manager. Whether a node operates as a cluster leader, server, client, etc., can be transparent to users of the cluster. A user will perceive a same behavior whether a node operates as both the client and server, or the client is on a remote node.

A clustered file system manager can maintain metadata as a hierarchy of inodes for files of the clustered file system. The clustered file system metadata indicates information about logical units of storage of the clustered storage resources. The information can include location of a cluster storage unit (e.g., offset or block number) and length of an extent. In this description, the term "block" will be used to refer to a unit of cluster storage (e.g., a 4 KB block). This description will also use the term "extent" to refer to a set of contiguous blocks. When referring to a "length" of an extent, the length refers to a number of contiguous blocks that form the extent. Using these terms, a clustered file system views a pool of storage resources totaling 10 GB as 0 to 2,621,439 blocks, assuming 4 KB blocks. When a cluster client writes to logical units of cluster storage, the logical units (e.g., block numbers) are translated by a storage virtualization layer into physical locations (e.g., seek and offset) to carry out the write. Embodiments are not limited to blocks and extents, but accommodating every possible implementation for units of cluster storage (e.g., variable blocks, length in bits, etc.) would obfuscate the description.

In some embodiments, the clustered file system manager maintains the clustered file system metadata ("metadata") in a hierarchical data structure of inodes. The clustered file system manager maintains a root for the metadata a known location (i.e., predefined location) in the cluster storage resources ("cluster storage"). In a cluster that supports consistency snapshots, multiple locations in the cluster storage are reserved or defined for storing roots of consistency snapshots along with root metadata of the corresponding consistency snapshots. The root metadata helps to identify the consistency snapshots and to ensure integrity of the consistency snapshots. Embodiments can use time-based identifiers of consistency snapshots (e.g., generation value) that track progression of consistency snapshots and root checksums for verifying data integrity. Embodiments can write a first root checksum ("header checksum") when a node begins to write the root and a second root checksum ("trailer checksum") after the root has successfully been written to persistent cluster storage. Embodiments can use the header checksum and trailer checksum to ensure that writing of the root of a consistency snapshot was not interrupted. To recover from a failure, each of the locations is examined and the location with the most recent generation value is selected to allow recovery to begin with that consistency snapshot referenced by the selected location. Embodiments can configure a cluster to preserve any number of consistency snapshots.

Some example embodiments provide consistency snapshots of data in a given file system, wherein such snapshots do not block or delay incoming file system transactions while the consistency snapshot is being committed to storage. Accordingly, updates to data stored in the file system can occur concurrently with the storage of consistency snapshots of the same file system. As further described below, at least two contexts for a same data object are maintained so that this concurrency is enabled.

Consistency snapshots of the file system are associated with unique generation values. For example, the generation values can be integer values. Accordingly, when the committing to storage of a consistency snapshot (i.e., syncing of the consistency snapshot) is started, the generation for the file system can be incremented.

In some example embodiments, any modification to an object (e.g., data, file, etc.) in the file system is associated with a transaction. The transaction is associated with a generation of the file system and thus associated with a consistency snapshot. In some example embodiments in a dual context configuration, objects in the file system are cached with at most two copies of the object at any one time. One copy is for the update in progress context. In particular, the update in progress context for an object is created after the object is being updated (e.g., a user updates the object) and while a consistency snapshot of the file system having the object is being committed to storage. A second copy of the object is for the commit in progress context. This copy of the object is a copy of the object that is being/will be committed to storage as part of the consistency snapshot. In some example embodiments, the two objects can be cached together as an array of size two. Also, the object has an array of two elements that stores the generation associated with each object in the array.

In some example embodiments, to determine which context of the object to use, the generation value or generation number associated with the transaction is compared with the generation number of the cached object. The correct object array element is selected to modify the correct context of the object (e.g., update in progress context or the commit in progress context).

As further described below, the consistency snapshots are periodically (e.g., every five seconds) created. These consistency snapshots are created to attempt to recover previous versions of objects. For example, these consistency snapshots can be used to recover objects stored in the file system after a system crash. In some example embodiments, if a consistency snapshot interval is reached before the previous consistency snapshot has finished its sync (commit to storage), the new consistency snapshot is skipped. In particular, no consistency snapshot would be taken at that time because a third copy of the cached object would be required.

FIG. 1 depicts a conceptual diagram of a clustered file system configuration to provide multiple contexts for data objects in a redirect-on-write file system, according to some example embodiments. The depicted cluster comprises nodes 103, 105, 107, 109. The cluster also comprises pool 101 of directly accessible storage devices; network accessible storage devices 113, 115; and network infrastructure 111. Nodes 103, 105, 107, 109 communicate via network infrastructure 111. Nodes 103, 105, 107, 109 access storage device pool 101 via cables and access network accessible storage device 113, 115 via network 111. In the depicted cluster, any of the nodes 103, 105, 107, 109 can be configured as the clustered file system manager for the cluster. The clustered file system manager can manage various aspects of the storage of files of the clustered file system therein. For example, the clustered file system manager can maintain metadata as a hierarchy of inodes for files of the clustered file system. In some example embodiments, some or all of the operations of the clustered file system manager can be distributed to the different nodes 103, 105, 107, 109. Some of these operations include operations related to providing multiple contexts for data objects in the clustered file system (as further described below). While described below such that these operations for providing multiple contexts for data objects is distributed across the different nodes 103, 105, 107, 109, in some other example embodiments, such operations can be performed by the clustered file system manager.

Figure 2:
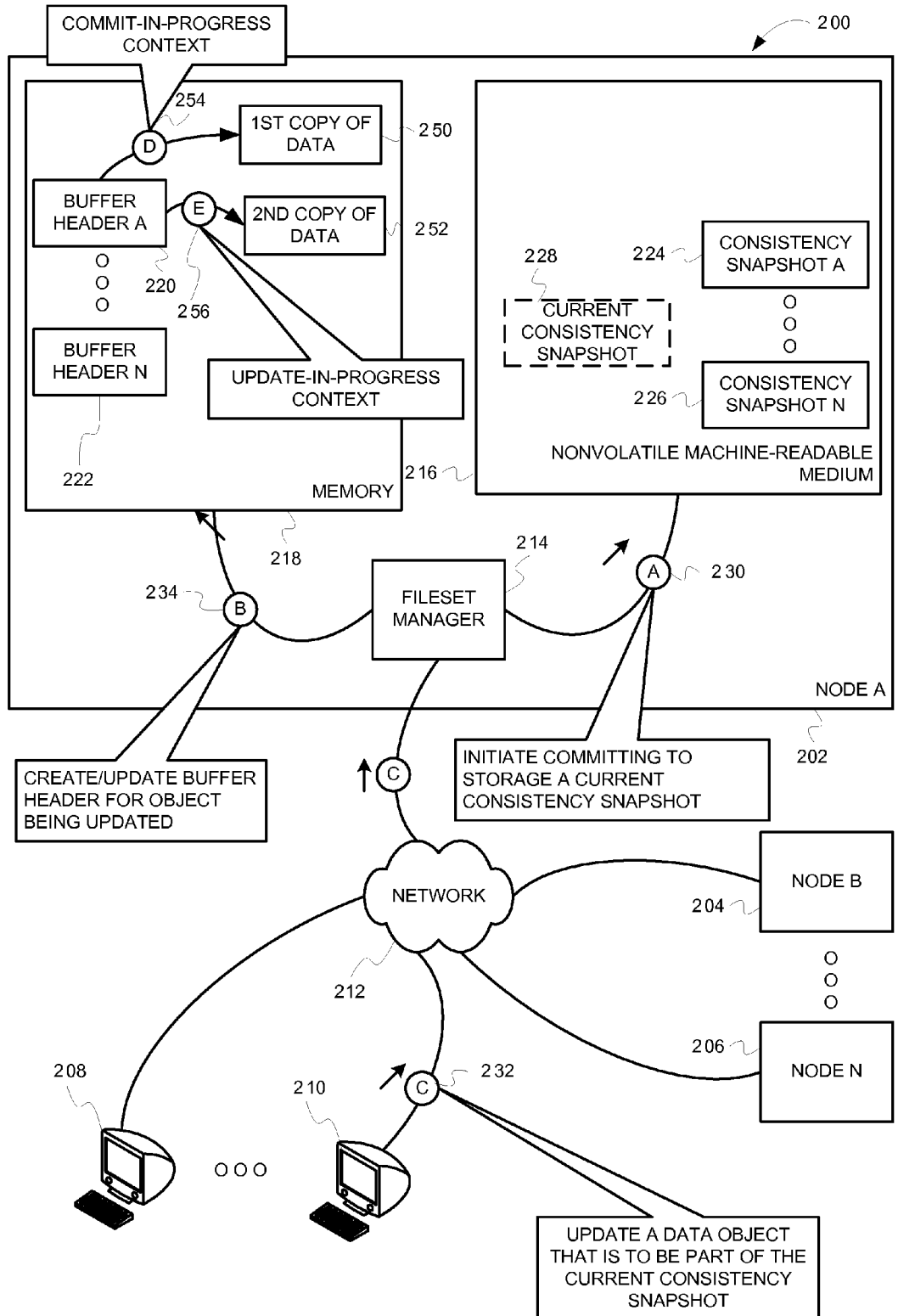
FIG. 2 depicts a more detailed conceptual diagram of clustered file system configuration to provide multiple contexts for data objects in a redirect-on-write file system, according to some example embodiments.

FIG. 2 depicts a more detailed conceptual diagram of clustered file system configuration to provide multiple contexts for data objects in a redirect-on-write file system, according to some example embodiments. FIG. 2 depicts system 200 that includes node A 202, node B 204, and node N 206 that can be representative of the nodes 103, 105, 107, 109 of FIG. 1. FIG. 2 depicts a number of components within node A 202. Although not shown, node B 204 and node N 206 can include similar components therein.

In some example embodiments, system 200 is configured to store data objects of a file system that uses redirect-on-write (ROW) when data is modified. In particular with a redirect-on-write, a new block is allocated for modified data. The file system can include one or more file sets. In some example embodiments, each file in the file system can include an inode. The inode can be a separate file or a data structure that stores information or metadata about the data stored in the file. For example for each part of the file (e.g., a block), the inode can store the address, the fileset identification, and the generation of the fileset where this data is stored. In particular, blocks where the data of a file are stored can be distributed across different filesets and generations of filesets. The different filesets and generations of filesets can be distributed across multiple storage devices. With reference to FIG. 2, these filesets can be stored in machine-readable media in any of node A 202, node B 204, and node N 206.

System 200 includes a number of client devices (shown as client device 208 and client device 210). System 200 includes network 212, wherein node A 202, node B 204, node N 206, client device 208, and client device 210 are communicatively coupled together through network 212.

Node A 202 includes fileset manager 214, nonvolatile machine-readable medium 216, and memory (e.g., a volatile machine-readable medium) 218 that are communicatively coupled together. Fileset manager 214 can be software, firmware, hardware or a combination thereof. For example, fileset manager 214 can be part of an operating system executing on a processor (not shown) in node A 202. Nonvolatile machine-readable medium 216 stores a number of consistency snapshots that have already been created (shown as consistency snapshot A 224 and consistency snapshot N 226). Nonvolatile machine-readable medium 216 is also storing current consistency snapshot 228 that is in the process of being committed to storage therein. In some example embodiments, the consistency snapshots are periodically (e.g., every five seconds) created. The consistency snapshots include a snapshot of the data objects in the file system at a given point in time. In some example embodiments, a consistency snapshot stores any modifications (e.g., changes, additions, deletions, etc.) to the data objects that are in memory 218 that have not yet been committed to storage in nonvolatile machine-readable medium 216, since the last consistency snapshot was committed to storage. These consistency snapshots are created to attempt to recover previous versions of objects stored in the file system. For example, these consistency snapshots can be used to recover objects stored in the file system after a system crash.

Memory 218 stores a number of buffer headers (buffer header A 220, buffer header N 222, etc.). As further described below (see description of FIG. 3), the buffer headers store various metadata regarding a data object stored in the file system. Fileset manager 214 creates a buffer header for a data object in the memory 218 (if not yet created therein) if the data object is being accessed, modified, etc. For example, fileset manager 214 can create a buffer header when the data object is being accessed to create current consistency snapshot 228, when the data object is being modified based on some client device request, etc. Based on the size of memory 218 and the number of data objects being accessed, fileset manager 214 may be required to flush some of the buffer headers whose associated data objects are not being accessed. Accordingly, fileset manager 214 may be required to recreate a buffer header for a data object in memory 218 when an access of the data object occurs. As further described below, the metadata in the buffer header stores a data pointer for the different copies of the data created for the given data object. In this example, buffer header A 220 has a first data pointer pointing to first copy of the data 250 and a second data pointer pointing to second copy of the data 252. Similar data pointers can be created for the different buffer headers stored in memory 218.

In some example embodiments, multiple copies of data for a same data object in the file system are created. Each of the multiple copies of the data can be associated with a different context. In some example embodiments, a data object can have two copies of its data for a dual context configuration. As an example, the memory 218 stores two copies of data for a same data object (first copy of data 250 and second copy of data 252). Any or all data objects stored in the file system can include this multi-copy, multi-context configuration. As shown, first copy of the data 250 has commit-in-progress context 254, and second copy of the data 252 has update-in-progress context 256. The two contexts for a same data object provide consistency snapshots of data in a file system, wherein such snapshots do not block or delay incoming file system transactions while the consistency snapshot is being committed to storage. Accordingly, updates to data stored in the file system can occur concurrently with the storage of consistency snapshots of the same file system. Specifically, commit-in-progress context 254 is associated with the copy of the data that is used to create this particular data object in current consistency snapshot 228. Update-in-progress context 256 is associated with the copy of the data that is used to accept updates to the data object (e.g., a user making modifications to the data), while current consistency snapshot 228 is being committed to storage (created in nonvolatile machine-readable medium 216).

FIG. 2 also depicts a number of operations (operation 230, operation 232, and operation 234). In this example, fileset manager 214 performs operation 230, wherein the fileset manager 214 initiates committing to storage a current consistency snapshot. In particular, fileset manager 214 initiates creation of current consistency snapshot 228. As part of the operation, fileset manager 214 can determine what data objects have been modified since the previous consistency snapshot was committed to storage. Fileset manager 214 can then write the modified data objects to new locations in nonvolatile machine-readable medium 216 in a bottom-up order. In some example embodiments, for each data object that is being stored in current consistency snapshot 228, fileset manager 214 can create and/or update an associated buffer header in memory 218 (shown as operation 234). If there is no associated buffer header in memory 218 for a data object, fileset manager 214 creates the buffer header when such data is being accessed for storing in current consistency snapshot 228. As further described below in reference to FIGS. 4-6, the buffer header for each data object includes various metadata (e.g., generation, context, location, data pointers). Fileset manager 214 updates this metadata as part of creating the buffer header in memory 218. Alternatively, if the buffer header is already instantiated within memory 218 for a given data object, fileset manager 214 can update the metadata therein. For example, fileset manager 214 can update various fields defining the generations and contexts for the multiple data being referenced by the data pointers (as further described below).

Also, prior to completion of the committing to storage of current consistency snapshot 228, a data object that is to be included in current consistency snapshot 228 is modified. In this example, client device 210 transmits an update request for a data object that is part of current consistency snapshot 228 over network 212 that is received by fileset manager 214 (shown as operation 232). In this situation, fileset manager 214 creates a second copy of the data in the data object that is copied from the first copy of the data (for example see first copy of data 250 and second copy of data 252). Also, the second copy of the data has a separate and different context from the context defined for the first copy of the data. In some example embodiments, a second copy of data is not created until the second copy is needed to provide dual context. For example, fileset manager 214 does not create the second copy until an update to a data object is requested while a consistency snapshot to store the same data object is in the process of being created. Also, fileset manager 214 creates and/or updates the buffer header for this data object in memory 218. For example, fileset manager 214 can update the second data pointer in the buffer header to point to the second copy of the data. Also, fileset manager 214 updates the contexts so that the two different copies of the data have two different contexts. A more detailed description of the operations of fileset manager 214 to provide multiple contexts for a data object are set forth below in reference to the flowcharts of FIGS. 5-6.

FIG. 3 depicts an example buffer header for a data object stored in a clustered file system, according to some embodiments. Buffer header 300 includes a number of fields related to a data object stored in a clustered file system. As described above, a buffer header for a data object is created in memory if not already in memory and in response to accessing the data object. For example, fileset manager 214 can access the data object for storing the data object in a consistency snapshot. In another example, fileset manager 214 can access the data object in response to some application updating the data object (e.g., a client devices 208, 210). In addition to creating the buffer header, fileset manager 214 can also populate the fields therein (302-316). Fields 302-304 define two different generation values for this data object. Last Committed Generation (LCG) field 302 defines the generation value for this data object during the last time when this data object was committed to storage in a consistency snapshot. Last Updated Generation (LUG) field 304 defines the generation value for this data object during the last time when this data object was being updated. The generation value of a data object is incremented each time the data object is initially updated but prior to the data object being committed to persistent storage as part of a consistency snapshot. For example, assume the current generation value of the data object is 15. If some application attempts to update the data object after the data object has been committed to persistent storage as part of a consistency snapshot, the generation value is incremented to 16. This generation value of this data object remains at 16 until the data object is committed to persistent storage as part of a consistency snapshot.

Fields 306-308 define two different context values for this data object. These contexts values are set to either zero or one. In particular, the context for a data object flips between two values (as being part of a dual context). Last Committed Context (LCX) field 306 defines the context for this data object during the last time when this data object was committed to storage in a consistency snapshot. Last Updated Context (LUX) field 308 defines the context for this data object during the last time when this data object was being updated. For example, after the data object is committed to persistent storage as part of a consistency snapshot but prior to an update to the data object, both LCX field 306 and LUX 308 are set to a same value (e.g., one). Subsequently if some application attempts to update the data object, LUX field 308 is flipped to a value of zero. Subsequently when this data object is again committed to persistent storage as part of a consistency snapshot, LCX field 306 is flipped to a value of zero. The use of fields 302-308 are further described below in reference to the flowcharts of FIGS. 5-6.

Physical location field 310 defines the physical location of the data object in the file system (e.g., the block number). Logical location field 312 defines the logical location where the data object is stored based on the location of the associated inode for this data object. For example, the logical location can include the physical location of the inode plus some offset where this data object is stored.

Data pointer 0 field 314 stores a first data pointer (data pointer 0) that is pointing to a first copy of the data of the data object in memory 218. Data pointer 1 field 316 stores a second data pointer (data pointer 1) that is pointing to a second copy of the data of the data object in memory 218. As described above, a second copy of the data of the data object is not created until a second context for the data object is required. For example, only one copy of data of the data object can be provided after the data object has been committed to persistent storage as part of a consistency snapshot but prior to any subsequent updates to the data object. In this situation, data pointer 0 field 314 (pointing to the first copy of the data) points to the first copy of the data, and data pointer 1 field 316 (pointing to the second copy of the data) does not point to a location (e.g., NULL). A second copy of the data is created from a copy of the first copy of the data after a second context is needed for the data object. For example, assume that the data object is being stored in a consistency snapshot and concurrently a client device is requesting an update to the data object. In this situation, the second copy of the data object is created. Also, data pointer 0 field 314 (pointing to the first copy of the data) still points to the first copy of the data, and data pointer 1 field 316 (pointing to the second copy of the data) is now modified to point to the second copy of the data of the data object. The use of fields 314-316 are further described below in reference to the flowcharts of FIGS. 5-6.

Figure 4:
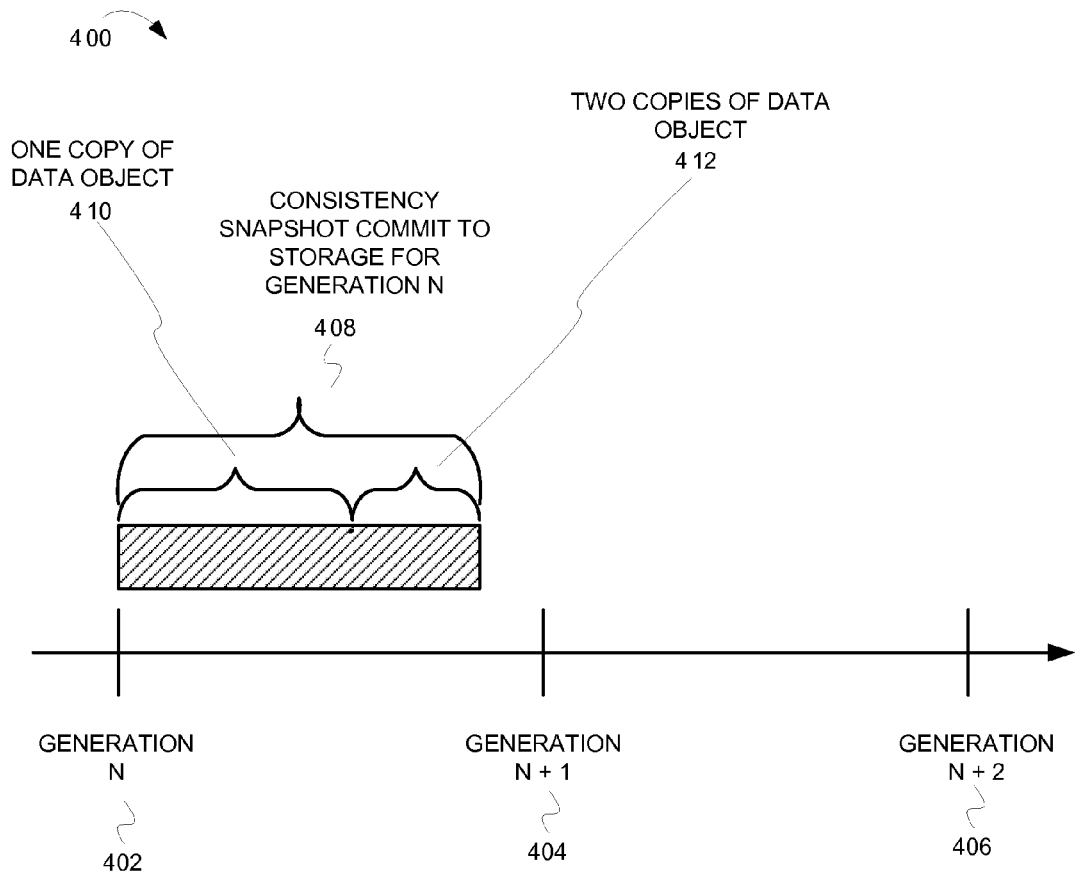
FIG. 4 depicts an example timeline of committing a consistency snapshot relative to multiple generations of a data object, according to some embodiments.

FIG. 4 depicts an example timeline of committing a consistency snapshot relative to multiple generations of a data object, according to some embodiments. Time line 400 increases over time from left to right. Time point 402 is a time when generation N for a data object has ended. Time point 404 is a later time when a later generation (generation N+1) for the same data object has ended. Time point 406 is a later time when a later generation (generation N+2) for the same data object has ended. Time period 408 is a period of time when a consistency snapshot is being committed to persistent storage (that includes the data object). Time period 408 is initiated at time point 402 after generation N has ended. As described above as part of the commit, fileset manager 214 traverses the hierarchy of data objects in bottom up order to capture block numbers and checksums of the child data objects. As shown, within time period 408 there are two sub periods—time period 410 and time period 412. Time period 410 includes a period of time wherein one copy or version of the data object exists in memory. For example, this time period can include a time when the data object is being committed to persistent storage, wherein the data object has not yet been modified (e.g., by an application executing on a client device). Time period 412 includes a period of time wherein two copies or versions of the data object exists in memory. Time period 412 is initiated in response to the data object being modified while the commit of the consistency snapshot for generation N is still occurring. For example, this time period can include a time when the data object is being committed to persistent storage and when the data object is being modified (e.g., by an application executing on a client device). In other words, a first version of a data object exists as part of a generation N consistency snapshot being published. A second version of the data object exists in case of and/or due to a write to the data object occurring in a current generation N+1 prior to completion of publication of the generation N consistency snapshot.

Figure 5:
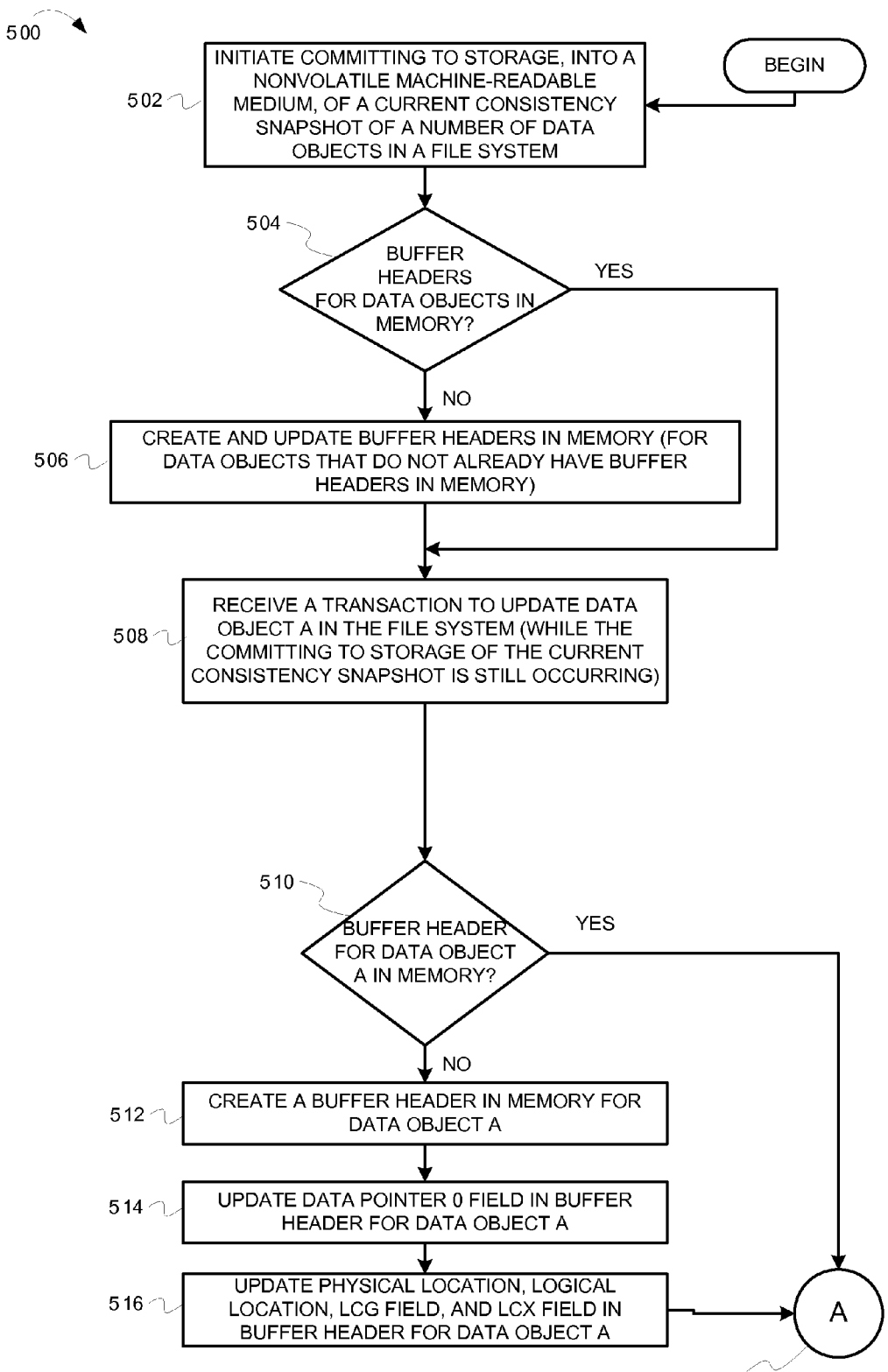
FIGS. 5-6 depict flowcharts of operations that provide multiple contexts for data objects in a redirect-on-write file system, according to some example embodiments.
Figure 6:
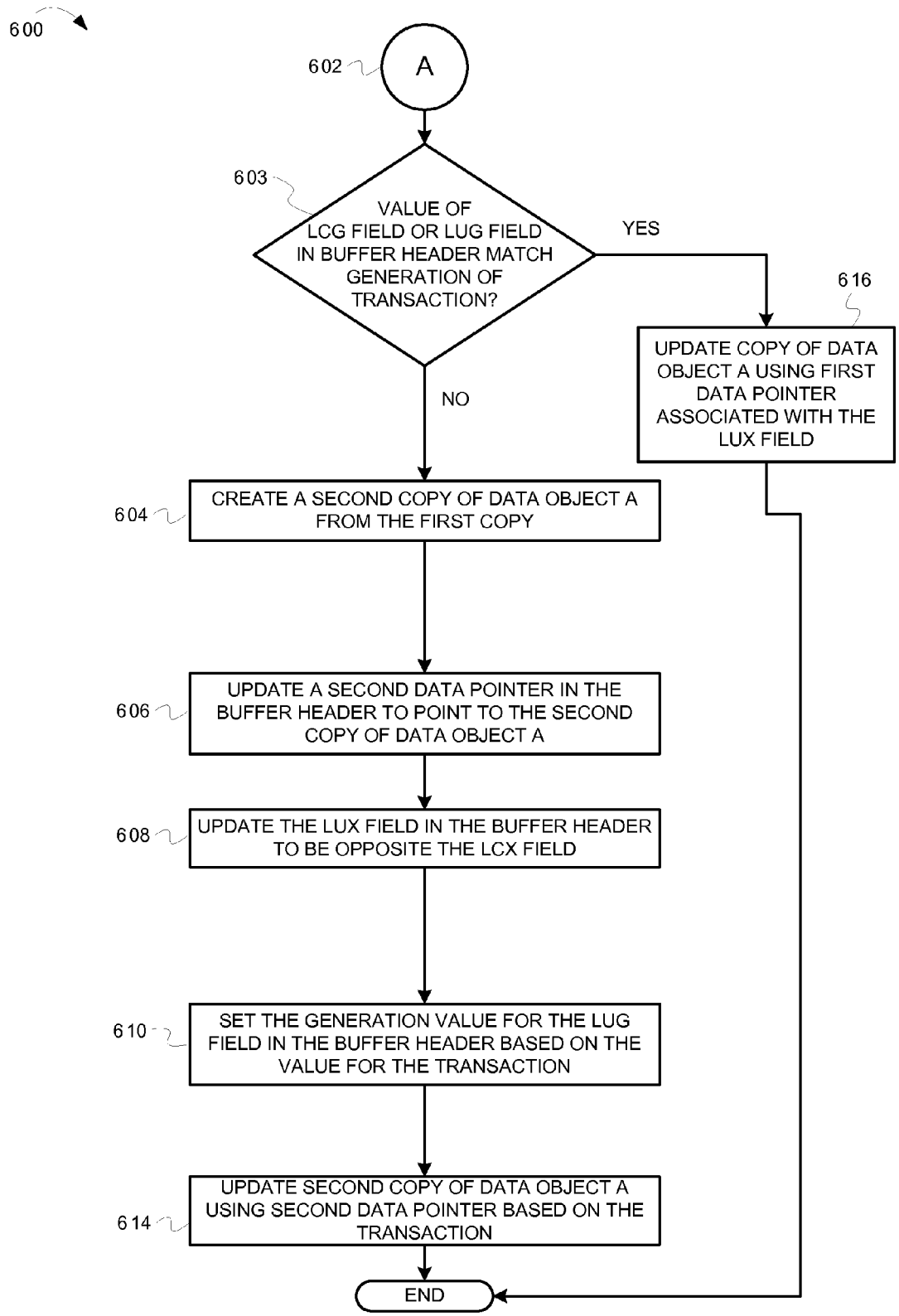

FIGS. 5-6 depict flowcharts of operations that provide multiple contexts for data objects in a redirect-on-write file system, according to some example embodiments. FIG. 5 depicts flowchart 500, and FIG. 6 depicts flowchart 600. Flowchart 600 is a continuation of flowchart 500, transitioning at point A. The flowcharts 500-600 are described as occurring in a decentralized configuration, wherein fileset manager 214 performs the operations therein. In some other example embodiments, the operations of the flowcharts 500-600 occur in a centralized configuration, wherein a file system manager can perform such operations. The flowcharts 500-600 depict an example situation where dual context for a data object is needed. In particular in this example situation, a consistency snapshot that includes a particular data object (termed "data object A) is being committed to storage in a nonvolatile machine-readable medium because data object A has been modified since a prior consistency snapshot has been committed to storage. Concurrently with this consistency snapshot being committed to storage, there is an operation to further modify data object A. For example, an application executing on a client device can be modifying data object A. Operations of flowcharts 500-600 are described in reference to FIGS. 1-3. Flowchart 500 is first described, followed by the description of flowchart 600

Fileset manager 214 initiates committing to storage, into a nonvolatile machine-readable medium, of a current consistency snapshot that includes a number of data objects in the file system (502). In some example embodiments, fileset manager 214 periodically commits to storage of a current consistency snapshot (e.g., three seconds, five seconds, 10 seconds, etc.). Accordingly, this operation can be one of the periodic operations for creating a consistency snapshot. With reference to FIG. 2, fileset manager 214 initiates committing to storage of current consistency snapshot 228. In some example embodiments, current consistency snapshot 228 will include data objects that have been modified since the prior consistency snapshot. Those changes to the data objects can reside in memory 218, such that the changes have not yet been committed to storage in nonvolatile machine-readable medium 216. Operations of flowchart 500 continue at 504.

Fileset manager 214 determines whether there are buffer headers in memory for the data objects that are to be stored in the current consistency snapshot (504). With reference to FIG. 2, fileset manager 214 determines whether there are buffer headers in memory 218 for the data objects that are to be stored in current consistency snapshot 228. In particular in some example embodiments, each time a data object is accessed (read from, written to, etc.), an associated buffer header is created in memory 218. If there are already buffer headers in memory for each of the data objects that are to be stored in current consistency snapshot 228, operations of flowchart 500 continue at 508. Otherwise, operations of flowchart 500 continue at 506.

Fileset manager 214 creates and updates buffer headers in memory (for data objects that do not already have buffer headers in memory) (506). With reference to FIG. 2, fileset manager 214 creates a buffer header in memory 218 for these data objects that do not have a buffer header in memory. Fileset manager 214 can also update the fields of the buffer header. With reference to FIG. 3, fileset manager 214 sets the values of these fields for the buffer headers for each of these data objects. Fileset manager 214 sets both LCG field 302 and LUG field 304 to the current generation value for the data object. For example, if the last committed consistency snapshot had a value of 5, fileset manager 214 would set LCG field 302 and LUG field 304 to 5. Context fields (306, 308) are set to either zero or one to differentiate between the two contexts (commit-in-progress context and update-in-progress context). Therefore if a second context is required, these two context fields 306,308 would have opposite values. If only one context is required, these two context fields 306, 308 would have the same value. In this situation, only one context for the data object is needed. Therefore, fileset manager 214 sets LCX field 306 and LUX field 308 to a same value (e.g., one). Fileset manager 214 sets physical location field 310 based on the data object's location in the file system (e.g., the block number). Fileset manager 214 sets logical location field 312 based on the location of the associated inode for this data object. For example, the logical location can include the physical location of the inode plus some offset where this data object is stored. Fileset manager 214 updates data pointer 0 field 314 in buffer header 300 to point to the location in memory 218 where the first copy of the data is located. Because this situation is not requiring multiple contexts, a second data object is not needed. Accordingly, fileset manager 214 updates data pointer 1 field 316 to point to NULL. Operations of flowchart 500 continue at 508.

Fileset manager 214 receives a transaction to update data object A (that is part of the data objects that are to be part of the current consistency snapshot) in the file system (while the committing to storage of the current consistency snapshot is still occurring) (508). With reference to FIG. 2, fileset manager 214 receives a transaction to update data object A from one of client devices 208, 210. For example, an application executing on one of client devices 208, 210 can update data object A. Operations of flowchart 500 continue at 510.

Fileset manager 214 determines whether there is a buffer header in memory for data object A (510). With reference to FIG. 2, fileset manager 214 determines whether there is a buffer header in memory 218 for data object A. In particular in some example embodiments, each time a data object is accessed (read from, written to, etc.), an associated buffer header is created in memory 218. If there is already a buffer header in memory 218 for data object A, operations of flowchart 500 continue at continuation point A (518). Otherwise, operations of flowchart 500 continue at 512.

Fileset manager 214 creates a buffer header in memory for data object A (512). With reference to FIG. 2, fileset manager 214 creates a buffer header in memory 218 for data object A, because there is not an associated buffer header for data object A in memory 218. Fileset manager 214 can also populate the fields of the buffer header (as further described by the operations below). Operations of flowchart 500 continue at 514.

Fileset manager 214 updates data pointer 0 field in the buffer header for data object A (514). With reference to FIGS. 2-3, fileset manager 214 updates data pointer 0 field 314 in buffer header 300 to point to the location in memory 218 where the first copy of the data is located. Operations of flowchart 500 continue at 516.

Fileset manager 214 also updates the physical location, the logical location, the LCG field, and the LCX field in the buffer header for data object A. With reference to FIGS. 2-3, fileset manager 214 updates physical location field 310, logical location field 312, LCG field 302, LCX field 306 for buffer header 300. Fileset manager 214 sets physical location field 310 based on the data object's location in the file system (e.g., the block number). Fileset manager 214 sets logical location field 312 based on the location of the associated inode for this data object. For example, the logical location can include the physical location of the inode plus some offset where this data object is stored. Fileset manager 214 sets LCG field 302 to the current generation value for data object A. For example, if the last committed consistency snapshot had a value of 5, fileset manager 214 would set LCG field 302 to 5. Context fields (306, 308) are set to either 0 or 1 to differentiate between the two contexts (commit-in-progress context and update-in-progress context). Therefore if a second context is required, these two context fields 306, 308 would have opposite values. If only one context is required, these two context fields 306, 308 would have the same value. Assume that fileset manager 214 sets LCX field 306 to 1. The setting of LUX field 308 is described below. Operations of flowchart 500 continue at continuation point A (518).

Continuation point A (518) continues at continuation point A (602) of flowchart 600. From continuation point A (602), operations continue at 603.

Fileset manager 214 determines whether the value of the LCG field or the LUG field in the buffer header for data object A matches the generation value of the transaction (603). With reference to FIGS. 2-3, fileset manager 214 determines whether the value of LCG field 302 or the value of LUG field 304 in buffer header 300 matches the generation value of the transaction. The generation value of the transaction is set to the consistency generation based on when the transaction was created. Therefore, fileset manager 214 determines whether this generation associated with the transaction equals the last committed generation or the last updated generation. If there is not a match, operations continue at 604. Otherwise, operations continue at 616 (further described below).

Fileset manager 214 creates a second copy of data object A from the first copy of data object A (604). With reference to FIG. 2 and assume that first copy of data 250 is a first copy of data object A, fileset manager 214 copies first copy of data 250 to a different location in memory 218—second copy of data 252. Operations of flowchart 500 continue at 606.

Fileset manager 214 updates a second data pointer in the buffer header to point to the second copy of data object A (606). With reference to FIGS. 2-3, fileset manager 214 updates data pointer 1 field 316 to point to the second copy of data object A in memory 218. Operations of flowchart 600 continue at 608.

Fileset manager 214 updates the LUX field in the buffer header to have an opposite value to the value of the LCX field (608). With reference to FIGS. 2-3, fileset manager 214 updates LUX field 308 to have a value that is opposite a value of LCX field 306 in the buffer header 300. As described above, the values of LCX field 306 and LUX field 308 can be one of two values. If a dual context situation arises (as in this case), the values of LCX field 306 and LUX field 308 are opposite of each other. Operations of flowchart 600 continue at 610.

Fileset manager 214 sets the generation value for the LUG field in the buffer header based on the generation value for the transaction) (610). With reference to FIGS. 2-3, fileset manager 214 updates the generation value for LUG field 304 (based on the generation value for transaction (see description of generation value for the transaction above in description of 603. Operations of flowchart 600 continue at 614.

Fileset manager 214 updates the second copy of the data object A based on this transaction (614). With reference to FIGS. 2-3 and assuming second copy of data 252 is a second copy of the data object A, fileset manager 214 updates second copy of data 252 based on the pointer value in data pointer 1 field 316. Operations of flowchart 600 are complete along this path of flowchart 600.

Returning to 603 and assuming that there is a match (yes decision), fileset manager 214 updates a copy of the data object A using the first data pointer associated with the LUX field in the buffer header for the data object A (616). In this situation, there was a match at 603 because the generation for the transaction would match the LUG field 304. With reference to FIGS. 2-3 and assuming the first data pointer is pointing to first copy of data 250, fileset manager 214 updates first copy of data 250 based on the pointer value in data pointer 0 field 314. Operations of flowchart 600 are complete along this path of flowchart 600.

Additional updates to the same or different data objects in the file system can continue to occur. Also, after completion of the committing of the consistency snapshot, fileset manager 214 can commit an additional consistency snapshot (based on the periodic interval for committing consistency snapshots to persistent storage).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
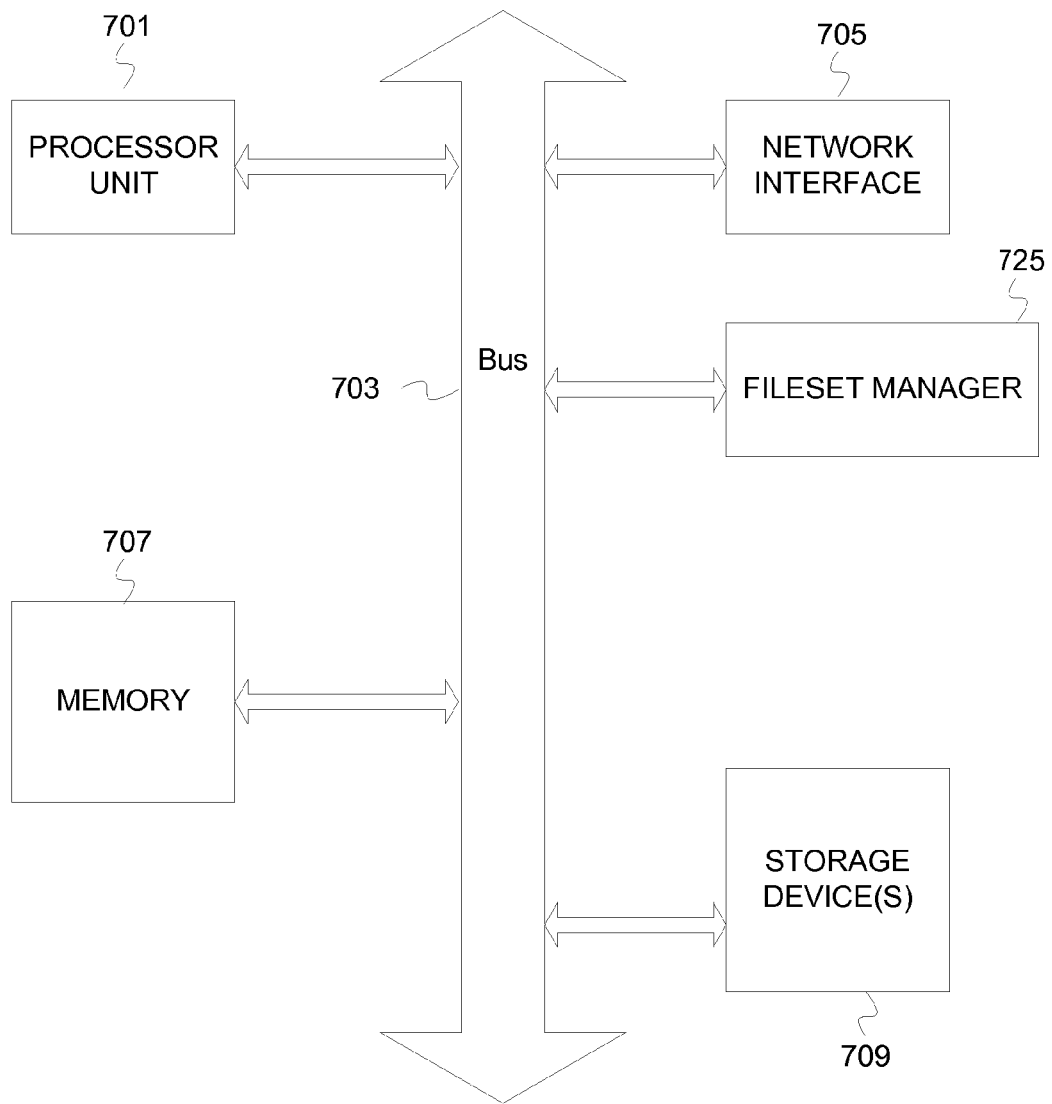
FIG. 7 depicts an example computer system.

FIG. 7 depicts an example computer system. A computer system includes processor unit 701 (possibly including multiple processors, multiple cores, multiple nodes, and/or implementing multi-threading, etc.). The computer system includes memory 707. Memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes bus 703 (e.g., PCI, ISA, PCI-Express, HyperTransport®, InfiniBand®, NuBus, etc.), network interface 705 (e.g., an ATM interface, an Ethernet interface, a Frame Relay interface, SONET interface, wireless interface, etc.), and storage device(s) 709 (e.g., optical storage, magnetic storage, etc.). The computer system also comprises fileset manager 725 that provides for multiple contexts for data objects in a redirect-on-write file system. Any one of these functionalities may be partially (or entirely) implemented in hardware and/or on processing unit 701. For example, the functionality may be implemented with an application specific integrated circuit, in logic implemented in processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, storage device(s) 709, and network interface 705 are coupled to bus 703. Although illustrated as being coupled to bus 703, memory 707 may be coupled to processor unit 701.

While the embodiments are described with reference to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:

initiating committing to storage, into a nonvolatile machine-readable medium, of a current consistency snapshot of a plurality of data objects in a redirect-on-write file system;

responsive to initiating committing to storage of the current consistency snapshot, creating a buffer header for a data object of the plurality of data objects, wherein the buffer header comprises a first data pointer to point to a first copy of the data object, and wherein the buffer header comprises a commit-in-progress context and an update-in-progress context, wherein the commit-in progress context and the update-in-progress context are initially assigned a same value;

assigning a generation value to the current consistency snapshot that is unique relative to generation values of other consistency snapshots, wherein the first copy of the data object has a generation value equal to the generation value of the current consistency snapshot, wherein a second copy of the data object to have a generation value greater than the generation value of the first copy of the data object;

receiving, during the committing to storage of the current consistency snapshot, an update to the data object, the update having a generation value greater than the generation value assigned to the current consistency snapshot;
responsive to receiving the update to the data object,
determining whether the generation value of the update matches at least one of the generation value of the first copy of the data object and the generation value of the second copy of the data object;
responsive to the generation value of the update not matching at least one of the generation value of the first copy of the data object and the generation value of the second copy of the data object,
assigning the update-in-progress context to a different value;
creating the second copy of the data object that is copied from the first copy of the data object, the second copy of the data object having the update-in-progress context; and
updating, based on the update, the second copy of the data object, independent of updating the first copy of the data object.

2. The method of claim 1, wherein the buffer header comprises a second data pointer, wherein the method comprises responsive to receiving updating the second data pointer to point to the second copy of the data object.

3. The method of claim 2, wherein the buffer header comprises a last committed generation field and a last updated generation field, wherein the last committed generation field and the last updated generation field are initially set to a value equal to a generation value assigned to a prior consistency snapshot that was committed prior to the current consistency snapshot.

4. The method of claim 3, further comprising, responsive to receiving the update to the data object, updating the buffer header to assign the last updated generation field to the generation value of the update.

5. The method of claim 1, wherein the current consistency snapshot comprises updates to the plurality of data objects since a prior consistency snapshot.

6. The method of claim 1, wherein the initiating of committing to storage of the current consistency snapshot is in response to a periodic operation to create a consistency snapshot.

7. A method comprising:
initiating committing to persistent storage of a current consistency snapshot of a plurality of data objects in a redirect-on-write file system, each of the plurality of data objects configurable to have multiple copies of data of the plurality of data objects having different contexts; wherein a data object of the plurality of data objects has a first copy having a first context of at least two contexts, wherein the first copy of the data object has a generation value equal to a generation value of the current consistency snapshot, wherein a second copy of the data object to have a generation value greater than the generation value of the first copy of the data object;
receiving during committing to storage of the current consistency snapshot, an update to a data object of the plurality of data objects; and
responsive to receipt of the update to the data object,
determining whether a generation value of the update matches at least one of the generation value of the first copy and the generation value of a second copy of the data object;
responsive to the generation value of the update not matching at least one of the generation value of the first copy of the data object and the generation value of the second copy of the data object,
creating the second copy of the data object from the first copy, the second copy of the data object having a second context of the at least two contexts; and
updating, based on the update, the second copy of the data object.

8. The method of claim 7, further comprising assigning the generation value to the current consistency snapshot that is unique relative to generation values of other consistency snapshots.

9. The method of claim 7, wherein the current consistency snapshot comprises updates to the plurality of data objects since a prior consistency snapshot.

10. The method of claim 7, wherein the initiating of committing to persistent storage of the current consistency snapshot is in response to a periodic operation to create a consistency snapshot.

11. An apparatus comprising:
a nonvolatile machine-readable medium;
a volatile machine-readable medium;
a processor;
a fileset manager operable to execute on the processor, the fileset manager configured to,
initiate committing to storage, into the nonvolatile machine-readable medium, of a current consistency snapshot of a plurality of data objects in a redirect-on-write file system, a data object of the plurality of data objects configurable to have multiple copies of data of the plurality of data objects having different contexts; wherein the first copy having a first context of the different contexts, the first copy configured to be stored in the volatile machine-readable medium, wherein the first copy of the data object has a generation value equal to a generation value of the current consistency snapshot, wherein a second copy of the data object to have a generation value greater than the generation value of the first copy of the data object;
receive, during committing to storage of the current consistency snapshot, an update to a data object of the plurality of data objects; and
responsive to receipt of the update to the data object,
determine whether a generation value of the update matches at least one of the generation value of the first copy and the generation value of a second copy of the data object;
responsive to the generation value of the update not matching at least one of the generation value of the first copy of the data object and the generation value of the second copy of the data object,
create the second copy of the data object in the volatile machine-readable medium from the first copy, the second copy of the data object having a second context of the different contexts; and
update, based on the update, the second copy of the data of the data object.

12. The apparatus of claim 11, wherein the fileset manager is configured to assign the generation value to the current consistency snapshot that is unique relative to generation values of other consistency snapshots.

13. The apparatus of claim 11, wherein the current consistency snapshot comprises updates to the plurality of data objects since a prior consistency snapshot.

14. The apparatus of claim 11, wherein the initiation of the committing to storage of the current consistency snapshot is in response to a periodic operation to create a consistency snapshot.

15. A computer program product for providing multiple contexts for a data object of a plurality of data objects, the computer program product comprising:

a non-transitory computer readable storage medium having computer usable program code embodied therewith, the computer usable program code comprising a computer usable program code configured to:

initiate committing to storage, into a nonvolatile machine-readable medium, of a current consistency snapshot of the plurality of data objects in a redirect-on-write file system;

responsive to initiation to committing to storage of the current consistency snapshot, create a buffer header for a data object of the plurality of data objects, wherein the buffer header comprises a first data pointer to point to a first copy of the data object, and wherein the buffer header comprises a commit-in-progress context and an update-in-progress context, wherein the commit-in progress context and the update-in-progress context are initially assigned a same value;

assign a generation value to the current consistency snapshot that is unique relative to generation values of other consistency snapshots, wherein the first copy of the data object has a generation value equal to the generation value of the current consistency snapshot, wherein a second copy of the data object to have a generation value greater than the generation value of the first copy of the data object;

receive, during the committing to storage of the current consistency snapshot, an update to the data object, the update having a generation value greater than the generation value assigned to the current consistency snapshot;

responsive to receiving the update to the data object, determining whether the generation value of the update matches at least one of the generation value of the first copy of the data object and the generation value of the second copy of the data object;

responsive to the generation value of the update not matching at least one of the generation value of the first copy of the data object and the generation value of the second copy of the data object, assigning the update-in-progress context to a different value;

create the second copy of the data object that is copied from the first copy of the data object, the second copy of the data object having the update-in-progress context; and update, based on the update, the second copy of the data object, independent of updating the first copy of the data object.

16. A computer program product of claim 15, wherein the buffer header comprises a second data pointer, wherein the computer usable program code is configured to, responsive to receipt of the update to the data object, update the second data pointer to point to the second copy of the data object.

17. The computer program product of claim 16, wherein the buffer header comprises a last committed generation field and a last updated generation field, wherein the last committed generation field and the last updated generation field are initially set to a value equal to a generation value assigned to a prior consistency snapshot that was committed prior to the current consistency snapshot.

18. The computer program product of claim 17, wherein the computer usable program code is configured to, responsive to receiving the update to the data object, update the buffer header to assign the last updated generation field to the generation value of the update.

19. The computer program product of claim 15, wherein the current consistency snapshot comprises updates to the plurality of data objects since a prior consistency snapshot.

20. The computer program product of claim 15, wherein the initiation of committing to storage of the current consistency snapshot is in response to a periodic operation to create a consistency snapshot.

* * * * *